United States Patent [19]

Ohnuki

[11] Patent Number: 4,668,066
[45] Date of Patent: May 26, 1987

[54] MOVABLE MIRROR SHIFTING MECHANISM FOR CAMERA

[75] Inventor: Ichiro Ohnuki, Tokyo, Japan

[73] Assignee: Canon Kabushiki Kaisha, Tokyo, Japan

[21] Appl. No.: 626,737

[22] Filed: Jul. 2, 1984

[30] Foreign Application Priority Data

Jul. 5, 1983 [JP] Japan ............................ 58-104408[U]

[51] Int. Cl.[4] ............................................ G03B 19/12
[52] U.S. Cl. .................................................. 354/152
[58] Field of Search ......................... 354/152, 153, 156

[56] References Cited

U.S. PATENT DOCUMENTS

| | | | |
|---|---|---|---|
| 3,568,585 | 3/1971 | Ishizaka | 354/156 |
| 4,327,982 | 5/1982 | Yamamichi et al. | 354/156 |
| 4,348,088 | 9/1982 | Yamamichi et al. | 354/152 |
| 4,480,904 | 11/1984 | Hiramatsu | 354/152 X |

*Primary Examiner*—W. B. Perkey
*Attorney, Agent, or Firm*—Toren, McGeady and Goldberg

[57] ABSTRACT

Various movable mirrors are arranged within a camera for shifting operation by a lifting mechanism and are provided with a mechanism for promptly settling the movable mirror on its return to an original position from a shifted position. The mechanism includes an antibounce member and when the mirror is forcedly shifted in response to an operation of the camera, the position of the member is biased to the outside of the moving locus of the mirror and upon return of the mirror to its original position, the member is released from the biased state and comes within the moving locus of the mirror to prevent rebound thereof.

20 Claims, 11 Drawing Figures

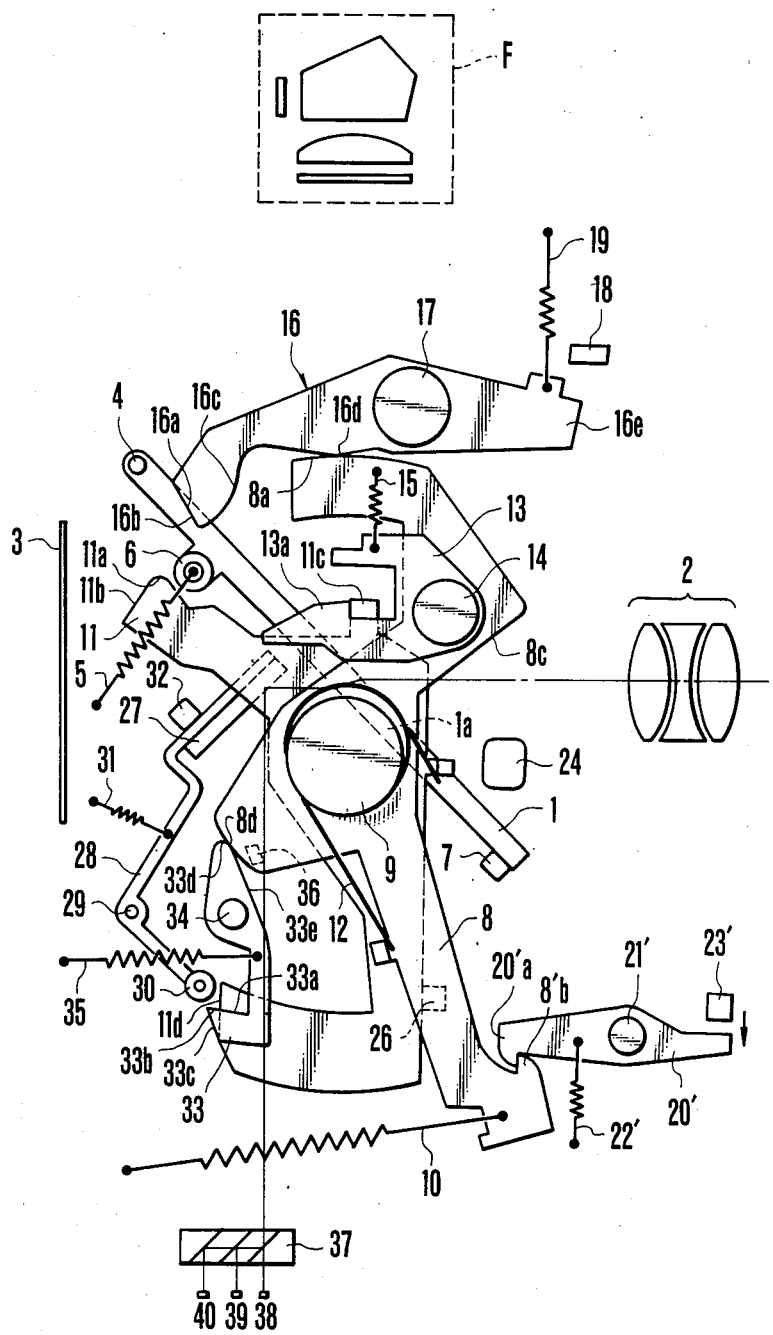

4,668,066

MOVABLE MIRROR SHIFTING MECHANISM FOR CAMERA

BACKGROUND OF THE INVENTION

1. Field of the Invention

This invention relates to a shifting mechanism for various movable mirrors used within a photographic camera and more particularly to a lifting mechanism, for example, for a main movable mirror which is arranged to be shiftable into a photo-taking optical path provided between a photo-taking lens and a film surface within a single-lens reflex camera and to be retractable from the optical path.

2. Description of the Prior Art

Various movable mirrors are arranged within a photographic camera. The main movable mirror of a single-lens reflex camera, for example, is arranged to be retractable by lifting it from its original position within a photo-taking optical path during a photographic operation and to be returned to the original position by means of a return spring upon completion of the photographic operation. However, both the main movable mirror and a stopper for receiving the mirror at its original position are resilient. It has been, therefore, difficult to prevent the main movable mirror from rebounding on its return due to the force of inertia of the mirror after its collision against the stopper.

The rebound of a movable mirror which takes place on its return to its original position has presented various problems. For example, in a case where a main movable mirror is provided for image observation at a view finder or for light measurement, the view finder image blurs during the rebound of the mirror. This not only prevents clear observation of the image but also makes it impossible to obtain an adequate photograph in the event of a high speed continuous automatic photographing operation to be carried out with an automatic film winder. In carrying out a high speed continuous automatic photographing operation with an automatic winder, it is necessary to perform light measurement and to determine exposure conditions within a short film winding time. However, the rebound of the main movable mirror which reflects part of or most of the light coming from an object through a photo-taking lens during the process of light measurement, prevents the light from reaching to a light receiving photo-sensitive element provided for TTL light measurement. In that event, a proper exposure setting is impaired. In a case where an auxiliary movable mirror is provided for the purpose of detecting a focus condition of the camera for automatic focusing, a high speed continuous automatic focusing photographing operation also calls for quick detection and quick focus adjustment within a short film winding time. In such a case, rebound of the above-stated auxiliary movable mirror which is provided for detecting a focus condition not only causes a blur of the object image on the focus detecting photo-sensitive element but also brings forth an erroneous focus condition signal as a result of a change caused thereby in the length of an optical path between the photo-taking lens and the photo-sensitive element.

To prevent the rebound of a movable mirror which takes place on its return to its original position, the present applicant has previously proposed a method disclosed in U.S. Pat. No. 4,327,982. In accordance with this method, an antibouncer member which is always disposed within the turning locus of the movable mirror is arranged to be brought by a spring force into sliding contact with a member attached to the movable mirror when the movable mirror comes to a point in the neighbourhood of its original position. This arrangement, however, inevitably causes the antibouncer member to become an extra load when the movable mirror is to be lifted. This load presents another problem. To effectively suppress the rebound of the movable mirror which takes place on its return to an original position, the spring force for the sliding contact must be increased. Then, the increased spring force results in an excessive load for the mirror lifting operation. Thus, the method presents a contradictory problem.

SUMMARY OF THE INVENTION

The present invention is directed to providing a solution to the above-stated problems of the prior art. It is therefore a principal object of the invention to provide a movable mirror shifting mechanism for a camera which eliminates all the problems of the prior art and which is not only capable of preventing the rebound of the movable mirror from occurring on its return to the original position thereof but which also does not create any extraneous load during a shifting operation on the movable mirror such as lifting operation.

The above and more specific objects and features of the invention will become apparent from the following detailed description of preferred embodiments thereof taken in connection with the accompanying drawings.

BRIEF DESCRIPTION OF THE DRAWINGS

FIG. 5 is a schematic illustration of a movable mirror lifting mechanism comprising a second embodiment of the invention.

DETAILED DESCRIPTION OF THE PREFERRED EMBODIMENTS

Figure 1:
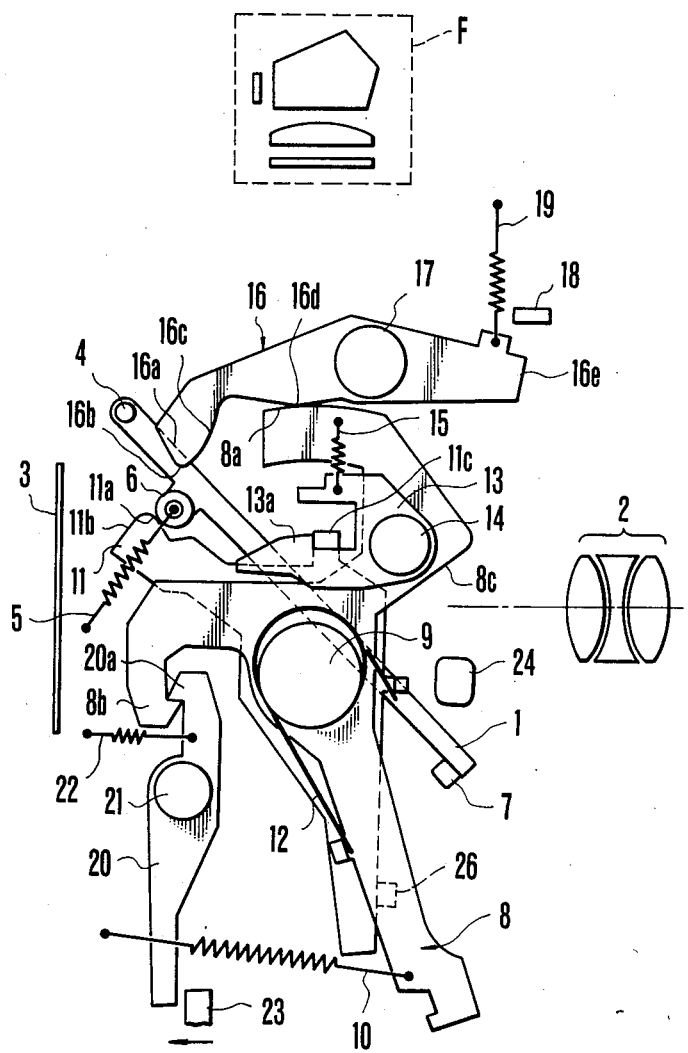
FIG. 1 is a schematic illustration of a movable mirror lifting mechanism comprising a first embodiment of the invention.
Figure 2:
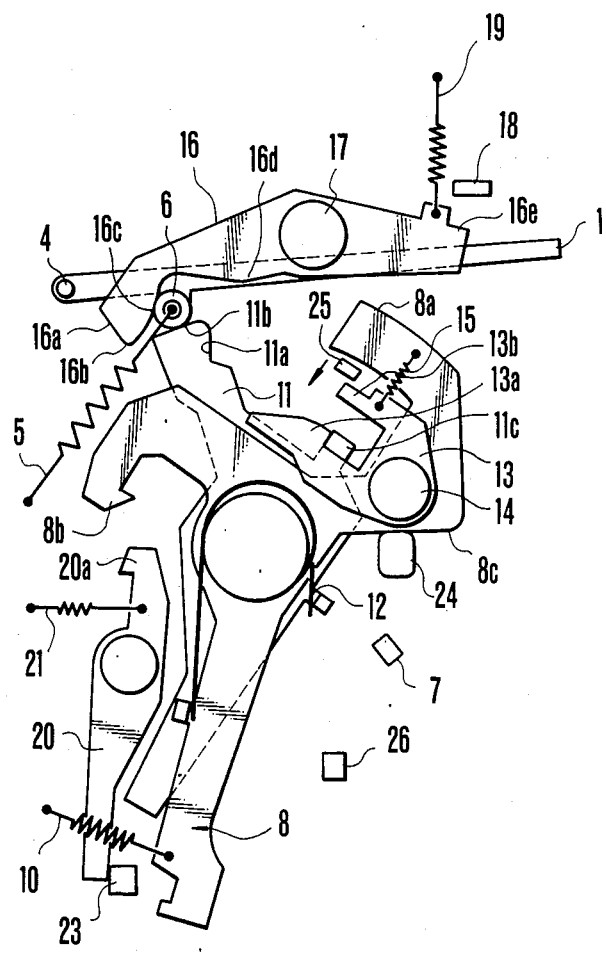
FIGS. 2 and 3 schematically show the operating states of the movable mirror lifting mechanism of FIG. 1.
Figure 3:
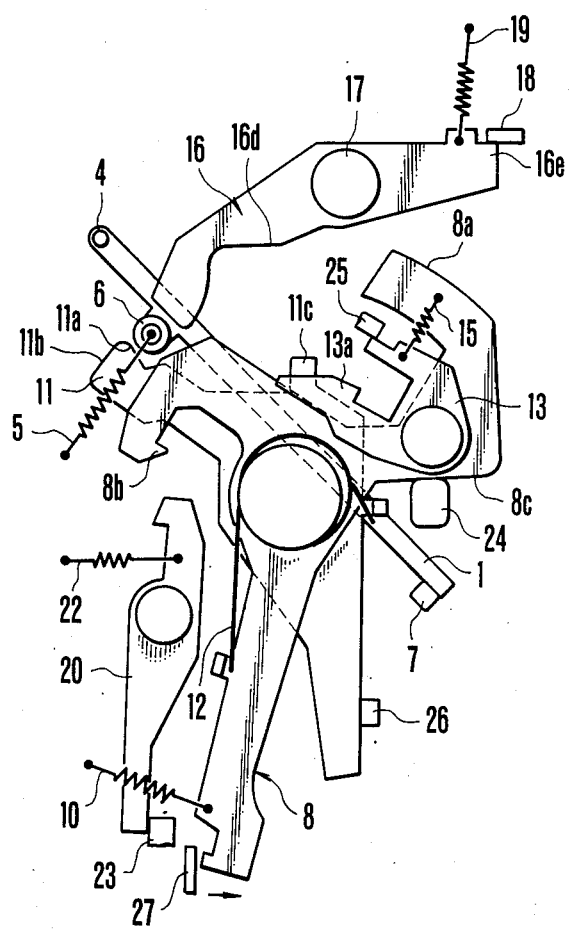

FIGS. 1, 2 and 3 show an arrangement of a movable mirror lifting mechanism to which the antibouncer device of the invention is applied as a first embodiment thereof. In FIG. 1, the embodiment is shown with the movable mirror in its original position after completion of a film winding process. FIG. 2 shows the embodiment with the mirror in its uppermost position after shutter release. FIG. 3 shows the embodiment immediately after the return of the mirror to its original position.

The embodiment illustrated includes a main movable mirror 1 which is arranged at an angle of 45° between a photo-taking lens 2 and an image plane or a film surface 3. The mirror 1 is pivotally carried at its upper end as viewed in the drawing by a shaft 4 which is secured to a camera body (not shown). A return spring 5 exerts a returning spring force on the main movable mirror 1 to urge it to turn clockwise. Close to the upper end, i.e. on the side of the shaft 4, there is arranged an uplifting pin 6 which is protrudes sidewise.

A stopper 7 is arranged to have the main movable mirror 1 abut thereon in its original position. A driving mechanism is arranged to uplift the main movable mirror 1 in response to shutter release and to bring the mirror back to its original position immediately after that. The details of this mechanism are set forth hereinafter:

A torque charging lever 8 is pivotally carried by a shaft 9 which is secured to the camera body. The lever 8 comprises an arcuate part 8a which engages an antibounce member 16 which will be described later herein; a first arm having an engaging face 8c arranged to engage a stopper 24 which sets a turnable limit to the clockwise turning movement of the charging lever 8 as viewed in the drawing; a second arm having hook part 8b arranged to stop the charging lever 8 in a torque charging state by engaging a hook pawl 20 which will be described later; and a third arm arranged to impart a turning moment to a mirror uplifting lever 11 in the counterclockwise direction as viewed in the drawing with a spring 12 disposed between the third arm and the mirror uplifting lever 11 which serves as a mirror driving member as will be further described later. Another spring 10 is arranged to impart a clockwise turning moment to the torque charging lever 8.

The mirror uplifting lever 11 is pivotally carried by the same shaft 9 as the charging lever 8. As mentioned above, the uplifting lever 11 is urged by the spring 12 to turn counterclockwise relative to the torque charging lever 8. Normally, an uplift lock lever 13 which is pivotally attached to the first arm of the charging lever 8 keeps the lever 11 in a fixed position relative to the lever 8 against the above-stated counterclockwise turning spring force. The lever 11 is provided with a locking part 11c which is bent for engagement with the uplift stop lever 13. The lever 13 which is provided with a locking part 13a for engagement with the locking part 11c is pivotally carried by a shaft 14 disposed on the first arm of the charging lever 8. A spring 15 is arranged to urge the lever 13 to turn in the direction of keeping the above-stated locking parts 11c and 13a in engagement with each other. When turned clockwise from the stationary state of FIG. 1, the mirror uplifting lever 11 comes to engage the main movable mirror uplifting pin 6 and is provided with engaging faces 11a and 11b for that purpose as will be further described later.

The hook pawl 20 is pivotally carried by a shaft 21 which is secured to the camera body. A spring 22 is arranged to urge the hook pawl 20 to turn counterclockwise as viewed on the drawing. For example, the hook part 20a of the pawl 20 engages the hook part 8b of the charging lever 8 in a hooked manner upon completion of film winding. Then, under this condition, the clockwise turning movement of the charging lever 8 is inhibited against the urging force of the spring 10.

A lever 23 is arranged to disengage the hook pawl 20 from the charging lever 8 by turning it clockwise in response to the operation of a shutter release mechanism (not shown). This interlocking lever 23 causes the main movable mirror uplifting operation to begin. In FIGS. 2 and 3, there is shown an interlocking lever (25) which operates in response to a shutter operation completion signal, such as a signal indicative of completion of the travel of a trailing shutter curtain in the case of a focal plane shutter. The lever 25 engages the engaging part 13b of the uplift lock lever 13 to cause it to turn counterclockwise against the urging force of the spring 15 in such a manner that this counterclockwise turn disengages the engaging parts 11c and 13a stopping the spring 12 from turning the mirror uplifting lever 11 counterclockwise. Thus, the operation of this interclocking lever 25 causes the return movement of the main movable mirror 1 toward its original position to begin.

After another interclocking lever 27, in response to film winding or the like after completion of a photographing operation, turns the charging lever 8 to bring it into the torque charging state in which it engages the hook pawl 20 in a hooked manner. A stopper 26 is arranged to set a limit to the counterclockwise turn of the mirror uplifting lever 11 which is caused by the spring 12 when the lever 11 is released from the fixed positional relation to the charging lever 8 kept via the uplift lock lever 13.

With the hook pawl 20, the charging lever 8, the mirror uplifting lever 11, the uplift lock lever 13, the interlocking levers and stoppers arranged in combination, the uplifting and returning processes are performed on the main movable mirror in a sequential manner. In accordance with this invention, an antibounce arrangement is provided in association with these parts. Referring to FIGS. 1, 2 and 3, the antibounce arrangement of this embodiment is shown as comprising an antibounce member or lever 16 which is pivotally carried by a shaft 17 which is secured to the camera body. The lever 16 is provided with: fore end parts 16a, 16b and 16c; a sliding contact part 16d which is in sliding contact with the arcuate part 8a of the charging lever 8; and an abutting part 16e which is arranged to abut on a stopper 18. A spring 19 is arranged to urge the lever 16 to turn counterclockwise as viewed on the drawing, i.e. in the direction of abutting on the stopper 18. The charging lever 8 and the main movable mirror uplifting pin 6 which are provided for the above-stated sequential operation are arranged to bias the position of the antibounce lever 16 against the urging force of the spring 19 into a state of having been turned clockwise to a predetermined degree. Upon return of the main movable mirror 1 to its original position, the lever 16 is temporarily released from the positional bias and is allowed to perform its antibounce function. The term "positional bias" of the antibounce lever 16 as used herein means that the lever is evacuated from the locus of the swinging movement of the uplifting pin 6 which takes place on the shaft 4 as shown in FIGS. 1, 2 and 3. When the lever 16 is released from the positional bias and is thus abutting on the stopper 18, the antibounce lever 16 comes within the swinging locus to restrict the swinging movement of the main movable mirror 1.

The movable mirror lifting mechanism which is arranged as described above operates in the following manner: Before commencement of photographing, the main movable mirror 1 is abutting on the stopper 7 and is located in its original position between the photo-taking lens 2 and the image plane 3 in a posture slanting 45 degrees. A light flux coming through the photo-taking lens 2 is guided to a view finder system F. Under this condition, the charging lever 8 is engaging the hook pawl 20 and is thus restrained from turning clockwise. The mirror uplifting lever 11 is in locked engagement with the uplift lock lever 13 and is restrained from turning counterclockwise. The antibounce lever 16 has its position biased with the part 16d thereof abutting on the arcuate part 8a of the charging lever 8. The fore end parts 16a, 16b and 16c of the lever 16 are located outside the locus of the swinging movement of the uplifting pin 6 which takes place about the shaft 4 (see FIG. 1). When the shutter mechanism is released under this condition, the lever 23 which is interlocked with this mechanism moves to the left as viewed on the drawing. This causes the hook pawl 20 to turn clockwise against the urging force of the spring 22. The charging lever 8 is disengaged from the hock pawl 20 and is suddenly turned clockwise on the shaft 9 by the urging force of the spring 10. Meanwhile, the uplift lock lever 13 and the mirror uplifting lever 11 remain engaged with each other. Therefore, the urging force of the spring 10 is also exerted on the mirror uplifting lever 11 via the uplift lock lever 13. The mirror uplifting lever 11 and the charging lever 8 then turn together on the shaft 9 in the clockwise direction. When the mirror uplifting lever 11 turned in this manner, the uplifting pin 6 abuts on the pushing face 11a of the mirror uplifting lever 11 and swings counterclockwise together with the main movable mirror 1 on the shaft 4 against the urging force of the spring 5. During the sequence of these operations, the arcuate part 8a of the charging lever 8 is in sliding contact with the part 16d of the antibounce lever 16 and the fore end parts 16a, 16b and 16c of the antibounce lever 16 is outside the swinging locus of the uplifting pin 6 as mentioned above in the initial stage of the swinging movement of the uplifting pin. Therefore, the uplifting pin 6 is allowed to swing irrespective of the antibounce lever 16.

The uplifting pin 6 further swings accordingly as the charging lever 8 and the mirror uplifting lever 11 turn. When the uplifting pin 6 passes the fore end part of the antibounce lever 16b and further swings, the arcuate part 8a of the charging lever 8 and the part 16d of the antibounce lever 16 come out of their sliding contact. This causes the antibounce lever 16 to be turned on the shaft 17 counterclockwise by the urging force of the spring 19. Then, the part 16c which forms a surface portion of the lever 16 positioned along the swinging locus of the pin 6 comes into sliding contact with the uplifting pin 6. However, since the force of the spring 19 is arranged to be much smaller than the force of the spring 10, the frictional resistance working at the sliding contact part between the part 16c of the antibounce lever 16 and the uplifting pin 6 is negligibly small as compared with the swinging force of the uplifting pin 6. Therefore, the main movable mirror 1 is allowed to continuously turn without being hindered by the sliding contact between the antibounce lever 16 and the uplifting pin 6 at all (see FIG. 2). The sliding contact between the part 16c of the antibounce lever 16 and the uplifting pin 6 is arranged to give a buffer effect at the final stage of the uplifting operation, so that the mirror can be smoothly brought to a stop at a predetermined uplifted position. The turning movement of the charging lever 8 comes to an end with the engaging face 8c thereof coming to abut on the stopper 24. By then, the part of the mirror uplifting lever 11 that abuts on the uplifting pin 6 has shifted from the pushing face 11a to the fore end face 11b.

In FIG. 2, the embodiment is shown in a state wherein the turning movements of the charging lever 8, mirror uplifting lever 11 and uplifting pin 6 have been all completed and the main movable mirror 1 has been completely uplifted.

With a sequence of exposure operations performed under this condition, when the lever 25 is operated in the direction of the arrow in response for example to a signal representative of completion of travel of the trailing curtain of the shutter, the lever 25 abuts on the engaging part 13b of the uplift lock lever 13 to cause the lever 13 to turn counterclockwise on the shaft 14 against the urging force of the spring 15. When the locking part 13a of the uplift lock lever 13 and the locking part 11c of the mirror uplifting lever 11 are disengaged from each other, the lever 11 is quickly turned counterclockwise by the urging force of the spring 12 back to its original position where it abuts on the stopper 26 as shown in FIG. 3. With the uplifting lever 11 thus coming back to the original position, the force of the return spring 5 causes the main movable mirror 1 to begin to descend. In this instance, during a period from the beginning of the descent of the main movable mirror 1 to a point of time immediately before completion of the descent, the uplifting pin 6 swings backward while keeping its sliding contact with the part 16c of the antibounce lever 16. Then, immediately before the mirror 1 collides with the stopper 7, the part of the antibounce lever 16 that is in sliding contact with the uplifting pin 6 shifts from the part 16c via the round part 16b to the part 16a of the lever. The pin 6 comes out of this sliding contact with the round part 16b in a very short period of time. Then, the urging force of the spring 19 immediately causes the antibounce lever 16 to turn counterclockwise on the shaft 17. The fore end part 16a of the lever 16 which is a face perpendicular to the swinging locus of the pin 6 then comes into the swinging locus (That is, a perpendicular line to the part 16a drawn from the point where the part 16a substantially comes into contact with the pin 6 is directed to the center of the shaft 17). The part 16e of the lever 16 then abuts on the stopper 18 to bring the turning movement of the lever 16 to a stop.

This condition in which the main movable mirror 1 is back in its original position with the mirror abutting on the stopper 7 and the antibounce lever 16 is abutting on the stopper 18 is as shown in FIG. 3. Under this condition, there is left only a slight clearance between the fore end part 16a of the antibounce lever 16 and the uplifting pin 6. The return of the main movable mirror 1 is completed with the mirror 1 having come to abut on the stopper 7. However, as mentioned in the foregoing, an elastic member is used as the stopper 7 in general for the purpose of buffering an impact on the mirror. This arrangement causes the mirror to rebound upward after collision with the stopper 7. Further, the main movable mirror 1 generally has a large inertial mass, which causes an elastic deformation of the whole mirror after the collision. Then, there takes place another rebound when the mirror is released from the elastic deformation.

If the main movable mirror 1 rebounds and turns upward on the shaft 4 again in the above-stated manner, the uplifting pin 6 also would swing counterclockwise on the shaft 4. In the case of this embodiment, however, the fore end part 16a of the antibounce lever 16 is within the swinging locus of the pin 6 at that instant. Therefore, the pin 6 collides with the part 16a when it moves within the very small clearance mentioned in the foregoing. Further, as apparent from the description given above, the antibounce lever 16 is arranged to restrain the pin 6 from further moving when the pin 6 collides with the fore end part 16a approximately perpendicularly to the latter. Therefore, the pin 6 swings backward immediately after its collision with the part 16a and then the main movable mirror 1 again comes back to its original position. With the mirror coming back to the original position, the rebound of the mirror is suppressed by the presence of the fore end part 16a of the antibounce lever 16.

In order to ensure the antibounce effect, it is of course necessary to have the uplifting pin 6 come away from the round fore end part 16b of the antibounce lever 16 during the process of the return of the main movable mirror 1; and, after the collision of the main movable mirror 1 with the stopper, to have the lever 16 come into the swinging locus of the lever 16 within the very short time before the pin 6 comes to collide with the fore end part 16a of the lever 16 after the rebound of the pin. However, the moment of inertia of the antibounce lever 16 can be made sufficiently small, so that the above-stated purpose can be sufficiently attained with small spring force of the spring 19.

With the condition of the mirror lifting mechanism as shown in FIG. 3, the whole system can be brought back to the condition as shown in FIG. 1 by operating the interlocking lever 27 in the manner as described in the foregoing.

Figure 4A:
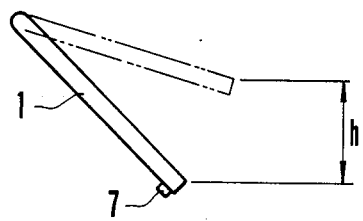
FIGS. 4(a) and 4(b) show the returning operation characteristic of the movable mirror.
Figure 4B:
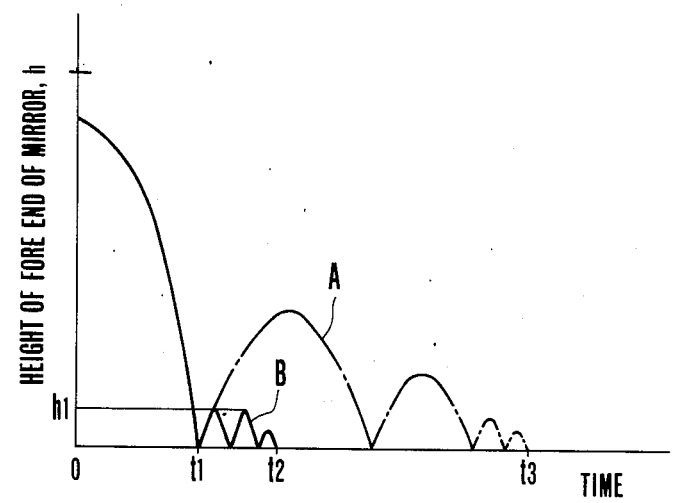

FIGS. 4(a) and 4(b) compare the antibounce effect attainable on the main movable mirror by the arrangement of this embodiment with the effect attainable by an example of the prior art arrangement. The rebounding state of the main movable mirror 1 is as shown in FIG. 4(a). In FIG. 4(b), the axis of abscissa shows time with the commencement of the return movement of the movable mirror set at the origin while the axis of ordinate shows the height of the fore end part of the mirror showing the attenuating state of the bounds of the mirror with the state of the mirror in the original position on the stopper set at the origin of the graph.

A one-dot-chain line A represents a case where no antibounce arrangement of the invention is provided. In this case, after the return of the movable mirror to the original position at a point of time t1, the rebound of the mirror is repeated several times before the mirror comes to settle at a point of time t3. The bouncing extent is great requiring a considerably long period of time for settlement. A full line B represents the effect attainable by the use of the mirror antibounce arrangement of the embodiment of this invention. Although the movable mirror comes back to the original position at the same point of time as in the case of the line A, the bouncing extent after that greatly decreases and it soon settles down at a point of time t2. Further, in the drawing, a height h1 of the fore end of the mirror, i.e. a bouncing extent of the mirror, represents the swinging extent of the fore end of the main movable mirror 1 corresponding to the clearance between the uplifting pin 6 and the fore end part 16a of the antibounce lever 16 shown in FIG. 3. Since the clearance is very small, the rebound of the mirror is limited to a very small extent.

Figure 6:
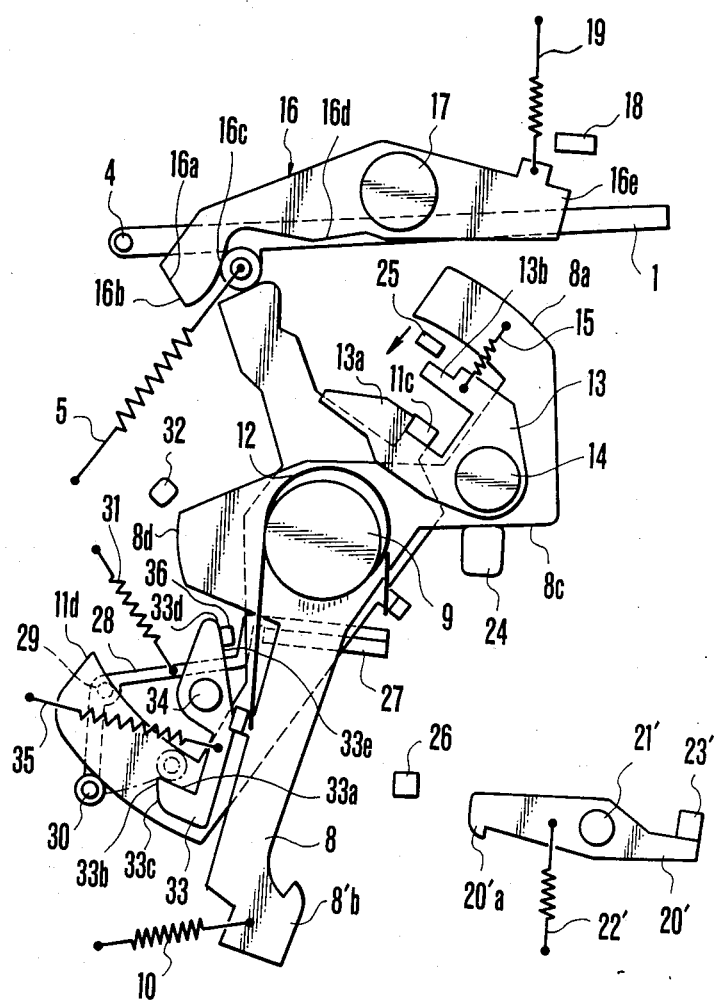
FIGS. 6 and 7 schematically show the operating states of the movable mirror lifting mechanism of FIG. 5.
Figure 7:
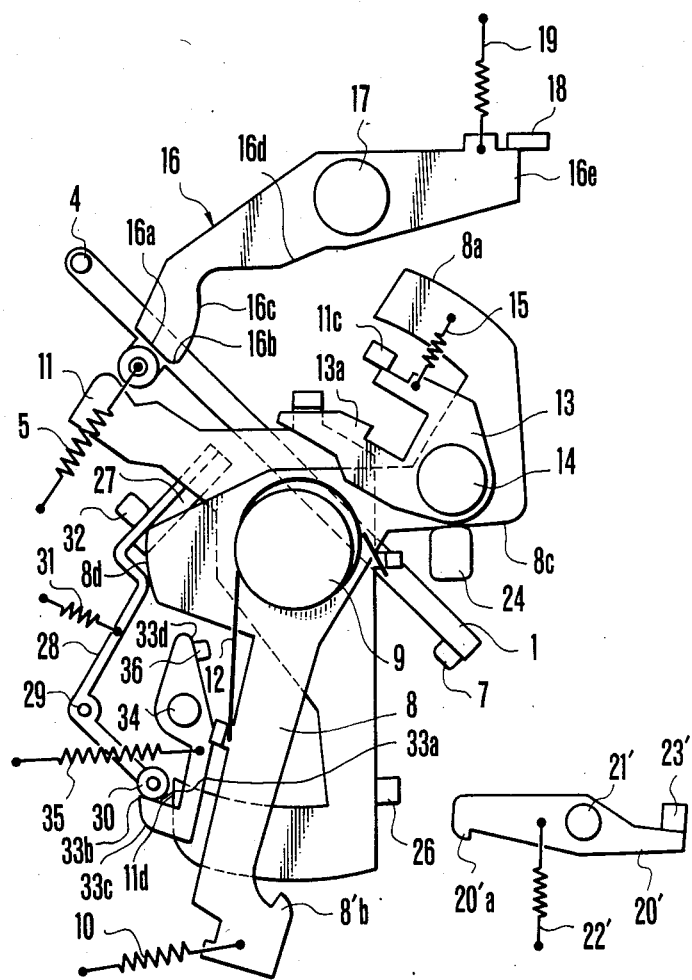

FIGS. 5, 6 and 7 show a second embodiment of this invention. The second embodiment features the inclusion of an auxiliary movable mirror for distance measurement in addition to the above-stated main movable mirror. In the second embodiment, the lifting mechanism for the main movable mirror 1 is similar to that of the first embodiment which has already been described. The components of the mechanism are, therefore, indicated in these drawings by the same reference numerals are those used for the description of the first embodiment and details thereof are omitted from description here. Referring to FIGS. 5, 6 and 7, a semi-transparent hole 1a is provided in the middle part of the main movable mirror 1. An incident light flux coming through a photo-taking lens 2 is transmissible through this hole to the auxiliary movable mirror 27 which will be described later. A torque charging lever 8 is provided with a hook part 8b' which is arranged to stop the lever 8 in a torque charged state by engaging a hook pawl 20'. The lever 8 is provided also with a second arcuate part 8d which forms a cam face for controlling the movement of an antibounce lever 33 for the auxiliary movable mirror 27. A mirror uplifting lever 11 is provided with an engaging face 11d for engagement with an uplifting pin 30 which will be described later. The hook pawl 20' is pivotally carried by a fixed shaft 21' and is urged by a spring 22' to turn counterclockwise as viewed on the drawing. For example, upon completion of film winding, the hook part 20a' of the hook pawl 20' engages the hook part 8b' of the lever 8 to inhibit the clockwise turning movement of the charging lever 8 against the urging force of a spring 10. A lever 23' is interlocked with a shutter release mechanism (not shown) and is arranged to disengage the hook pawl 20' from the charging lever 8 by causing the pawl 20' to make a clockwise turn. The operation of this interlocking lever 23' initiates an uplifting operation on the main movable mirror 1 in the same manner as in the case of the first embodiment. The auxiliary movable mirror 27 is arranged to cause the light passed through the semi-transparent hole 1a of the main movable mirror 1 to be reflected on focus detecting sensors 38, 39 and 40 which form a focus detecting optical system. The mirror 27 is carried by an auxiliary movable mirror carrying plate 28 which is turnable on a shaft 29. A return spring 31 is arranged to urge the auxiliary movable mirror 27 to turn counterclockwise. A return stopper 32 defines a stopping position for the counterclockwise turn of the mirror 27. A mirror down pin 30 is arranged to bring down the mirror 27 by engaging the engaging face 11d of the mirror uplifting lever 11 when the lever 11 makes a clockwise turn. The downward move of the mirror 27 permits an exposure operation on an image plane 3. An antibounce lever 33 is turnable on a shaft 34 and is arranged to prevent the auxiliary movable mirror 27 from rebounding. The lever 33 has fore end parts 33a, 33b and 33c which are arranged to come into sliding contact with the mirror down pin 30; a part 33d which is arranged to be in sliding contact with the second arcuate part 8d of the charging lever 8; and a part 33e which is arranged to abut on a stopper 36. A spring 35 is arranged to urge the antibounce lever 33 to turn clockwise in the direction of abutting on the stopper 36.

The charging lever 8 and the auxiliary mirror down pin 30 which are operating in association with each other bias the position of the antibounce lever 33 by turning it counterclockwise to a predetermined extent against the urging force of the spring 35. Upon return of the auxiliary movable mirror 27 to its original position, this positional biased state is temporarily liberated. An antibounce effect is attained under the condition of this temporary liberation of the biased state. The positional bias of the antibounce lever 33 means that the lever 33 is brought outside the swinging locus of the mirror down pin 30 which swings on the shaft 29. The liberation of this positional bias means that the lever 33 is abutting on the stopper 36 and is within the swinging locus of the pin 30 to restrict thereby the movement of the auxiliary movable mirror 27.

As shown in the drawings, the mechanism is provided with an optical path splitting prism 37. A light flux guided by the auxiliary movable mirror 27 is split by the prism 37 before it comes to the focus detecting sensors 38, 39 and 40. Among these focus detecting sensors 38, 39 and 40, the sensor 39 is disposed in a position equivalent to the image plane 3. The method for effecting detection of the focus condition with these sensors 38, 39 and 40 is known and, since it is irrelative to the subject matter of this invention, description thereof is omitted herein.

Next, the operation of the auxiliary movable mirror lifting mechanism which represents a feature of the second embodiment will be described with reference to FIGS. 5, 6 and 7. Before commencement of photographing, the auxiliary movable mirror 27 is in abutting engagement with the stopper 32. With the mirror 27 in this original position, the light flux passing through the semi-transparent hole 1a of the main movable mirror 1 is reflected toward the optical path splitting prism 37. Under this condition, the charging lever 8 is in locking engagement with the hook pawl 20' and is restrained from turning clockwise. The mirror uplifting lever 11 is in locking engagement with the uplift lock lever 13 and is thus restrained from turning counterclockwise. Meanwhile, the antibounce lever 33 is in the position biased state with the part 33d abutting on the second arcuate part 8d of the charging lever 8. Therefore, the fore end parts 33a, 33b and 33c of the antibounce lever 33 is outside the locus of the swinging movement of the mirror down pin 30 on the shaft 29. When the shutter release mechanism is released under this condition, the lever 23' which is interlocked with this mechanism moves in the direction of the arrow. This causes the hook pawl 20' to turn clockwise against the urging force of the spring 22'. The clockwise turn of the hook pawl 20' disengages it from the charging lever 8 to allow the lever 8 to be quickly turned clockwise on the shaft 9 by the urging force of the spring 10. Since the uplift lock lever 13 and the mirror uplifting lever 11 still remain in engagement with each other at that instant, the urging force of the spring 10 is imparted also to the mirror uplifting lever 11 via the uplift lock lever 13. Then, following the turning movement of the mirror uplifting lever 11, the mirror down pin 30 comes to abut on the pushing face 11d of the mirror uplifting lever 11 and swings clockwise on the shaft 29 together with the auxiliary movable mirror 27 against the urging force of the spring 31. During the initial stage of the swinging move of the mirror down pin 30 in the series of the above-stated processes, the second arcuate part 8d of the charging lever 8 is in sliding contact with the part 33d of the antibounce lever 33 while the fore end parts 33a, 33b and 33c of the lever 33 are outside the swinging locus of the pin 30 as mentioned in the foregoing. This allows the mirror down pin 30 to move irrespective of the antibounce lever 33. The swinging move of the mirror down pin 30 progresses accordingly as the charging lever 8 and the mirror uplifting lever 11 turn. When the pin 30 passes the fore end parts 33a–33c of the antibounce lever 33 and further swings, the second arcuate part 8d of the charging lever 8 comes out of the sliding contact with the part 33d of the antibounce lever 33. This allows the urging force of the spring 35 to turn the antibounce lever 33 clockwise. The turning move of the charging lever 8 comes to an end with the engaging face 8c coming to abut on the stopper 24.

FIG. 6 shows the embodiment with the auxiliary movable mirror 27 completely moved down. Under this condition, when a sequence of exposure operations are carried out and the lever 25 moves in the direction of the arrow in response to, for example, a signal indicative of completion of the travel of the trailing shutter curtain, the lever 25 comes to abut on the engaging part 13b of the uplift lock lever 13. This causes the lever 13 to turn counterclockwise on the shaft 14 against the urging force of the spring 15. The locking part 13a of the uplift lock lever 13 disengages from the locking part 11c of the mirror uplifting lever 11. Then, against the urging force of the spring 12, the lever 11 quickly turns counterclockwise and resumes its original position by abutting on the stopper 26 as shown in FIG. 7. With the mirror uplifting lever 11 having returned, the return spring 31 causes the auxiliary movable mirror 27 to immediately begin to ascend. In this instance, immediately before completion of the process of ascent of the mirror 27, the mirror down pin 30 comes into contact with the fore end part 33c of the antibounce lever 33 to cause thereby the lever 33 to turn counterclockwise against the force of the spring 35. Then, by the time the mirror down pin 30 goes through the angular part 33b and the auxiliary movable mirror 27 returns to the predetermined position thereof, the antibounce lever 33 is already within the swinging locus of the mirror down pin 30. The rebound of the mirror 27 on the stopper 32 can be greatly suppressed by virtue of the fore end part 33a of the antibounce lever 33.

It is a feature of the second embodiment that, immediately before the return of the auxiliary movable mirror 27, the mirror comes into contact with the fore end part 33c of the antibounce lever 33 to cause thereby the lever to turn against the force of the spring 35. This arrangement buffers the inertial torque of the mirror 27 on its return, so that substantially no rebound of the mirror 27 takes place on its return. With the spring force of the spring 35 and the contacting angle of the fore end part 33c suitably set, the inertial scope torque can be reduced to a great extent immediately before completion of the return travel of the mirror 27 to have no rebound when the mirror 27 comes back to the predetermined position. Therefore, with that arrangement, the antibounce action of another fore end part 33a of the antibounce lever 33 on the mirror 27 after its return can be arranged to serve only an auxiliary purpose.

Figure 8:
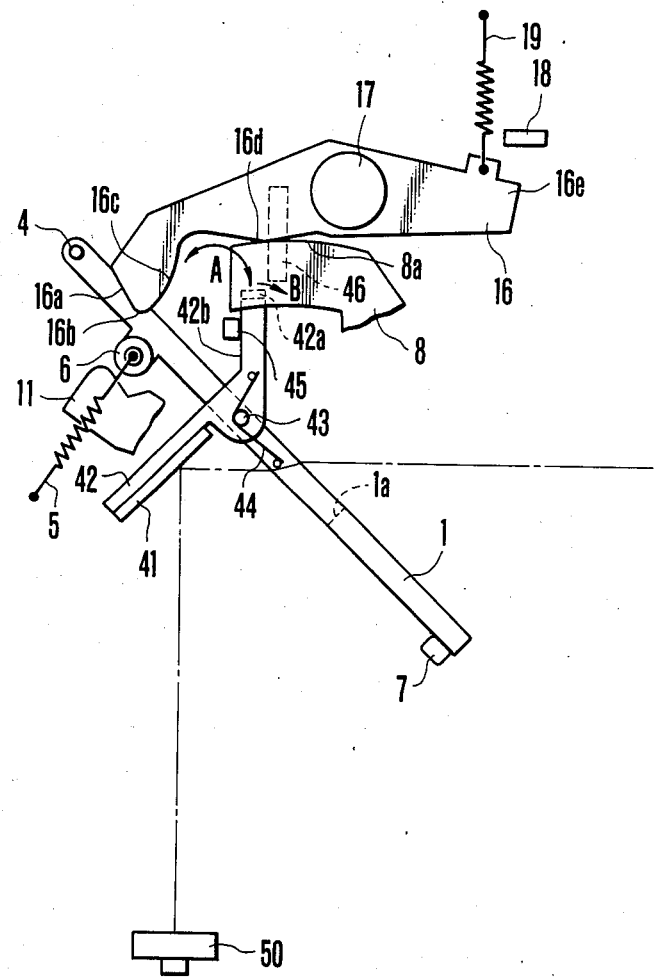
FIG. 8 is a schematic illustration of a movable mirror lifting mechanism comprising a third embodiment of the invention.
Figure 9:
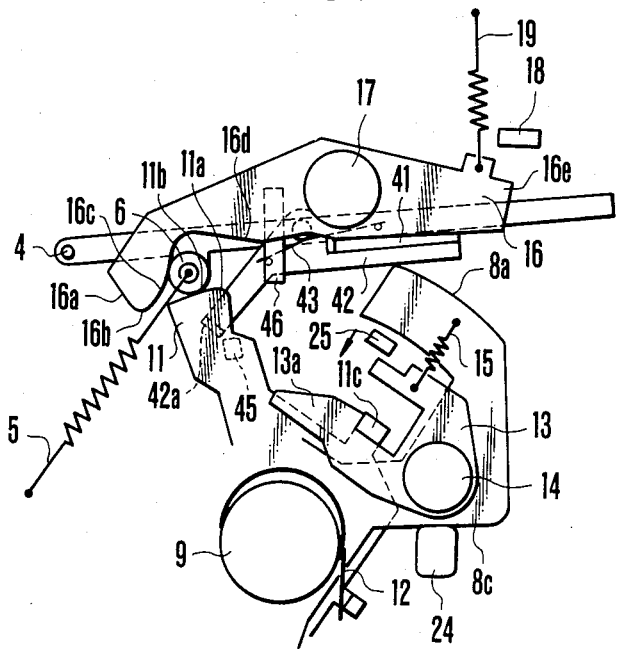
FIGS. 9 and 10 are schematic illustrations showing the operating states of the movable mirror lifting mechanism of FIG. 8.
Figure 10:
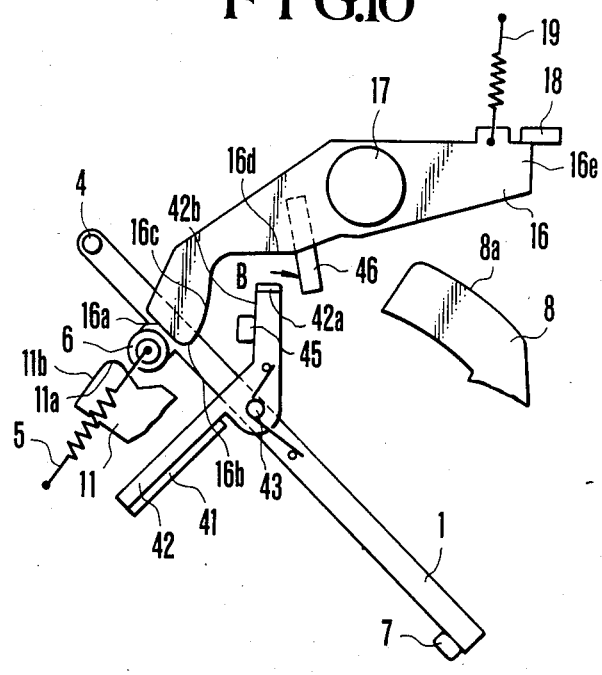

FIGS. 8, 9 and 10 show a third embodiment of the invention. In the third embodiment, a lifting mechanism which differs from that of the second embodiment is arranged for an auxiliary movable mirror. In this case, the auxiliary movable mirror is mounted on the main movable mirror. The lifting mechanism for the main movable mirror 1 of the third embodiment is similar to that of the first embodiment described in the foregoing. Therefore, the same components as those used for the first embodiment are indicated by the same reference numerals in FIGS. 8, 9 and 10 some of the details being omitted from the following description.

Referring to these figures, a semi-transparent hole 1a is provided in the middle part of the main movable mirror and is capable of allowing an incident light flux coming through a photo-taking lens 2 to pass there-through and to come to an auxiliary movable mirror 41. The light flux which passes through the semi-transparent hole 1a of the main movable mirror 1 is reflected and guided by the auxiliary movable mirror 41 toward a photo-electric element 50 of a photo-metric optical system. A plate 42 is arranged to carry the auxiliary movable mirror and to be turnable by a shaft 43 formed on the main movable mirror 1. A return spring 44 urges the auxiliary mirror carrying plate 42 to turn counterclockwise in the closing direction. The carrying plate 42 is provided with a bent part 42a which is formed at one end of the plate 42. A stopper 45 is secured to the camera body and is arranged to control the turning move of the auxiliary movable mirror 41 which takes place following the upward and downward moves of the main movable mirror 1. With the main movable mirror 1 in a lowered state as shown in FIG. 8, the stopper 45 keeps the auxiliary movable mirror 41 in an open state against the force of the return spring 44. When the mirror 1 is in an uplifted state as shown in FIG. 9, the mirror 41 is freed from engagement and is in a completely closed state. For the auxiliary movable mirror 41, there is provided an antibounce piece 46 which is either secured to or formed in one unified body with an antibounce lever 16. When the antibounce lever 16 moves to an antibounce position to prevent the main movable mirror 1 from rebounding in the same manner as in the case of the first embodiment, the antibounce piece 46 is concurrently brought into the locus of the swinging move of the above-stated bent part 42a which takes place on the shaft 43. The photo-electric element 50 is a photo-metric converter which receives the light flux reflected by the auxiliary movable mirror 41 for detecting the brightness of an object to be photographed. The photo-metric operation is carried out in accordance with a known method and, since the photo-metric operation is irrelevant to the subject matter of this invention, the details of it are omitted from the following description.

The operation of the lifting mechanism for the auxiliary movable mirror which represents a feature of the third embodiment will be described with reference to FIGS. 8, 9 and 10. In this embodiment, the antibounce piece 46 which prevents the auxiliary movable mirror 41 from rebounding is provided on the antibounce lever 16 which is arranged to prevent the main movable mirror 1 from rebounding. During the process of shifting the two mirrors 1 and 41 from their normal positions shown in FIG. 8 to their positions as shown in FIG. 9 in which the main movable mirror 1 is shifted to an uplifted state and the auxiliary movable mirror 41 to a closed position (by a counterclockwise turn), the positional bias of the antibounce lever 16 causes the antibounce piece 46 to be outside the turning locus of the bent part 42a as shown by arrows both A and B in FIG. 8. Then, when these mirrors are shifted from their positions of FIG. 9 to the positions of FIG. 10, that is, during the period in which the mirror uplifting lever 11 is quickly turned backward by the urging force of the spring 12 in response to a signal indicative of completion of travel of the trailing shutter curtain and the main movable mirror 1 is brought down to the stopper 7 by the force of the return spring 5, the counterclockwise turn of the antibounce lever 16 to the position shown in the drawing causes the antibounce piece 46 to come into the turning locus of the auxiliary movable mirror 41 as shown by an arrow B in FIG. 10. This prevents the auxiliary movable mirror 41 from rebounding in the clockwise direction as the bent part 42a comes to collide with the antibounce piece 46. Therefore, the mirror 41 is allowed to rebound only within a very small clearance and within a very short period of time.

In the third embodiment, the turning locus of the auxiliary movable mirror 41 is obtained in two different manners as represented by the above-stated arrow A and by another arrow B. This results from the fact that the auxiliary movable mirror 41 is mounted on the main movable mirror 1 which also turns. The turning locus of the bent part 42a of the auxiliary movable mirror 41 which is represented by the arrow A in FIG. 8 and which takes place following the ascent of the main movable mirror 1 is obtained by summing up the turning locus of the mirror 1 and that of the auxiliary movable mirror 41. Meanwhile, the locus of the turning movement of the bent part 42a which takes place while the main movable mirror 1 is in repose as represented by the arrow B of FIG. 10 is obtained relative only to the turning locus of the auxiliary movable mirror 41. In the case of this embodiment, the antibounce piece 46 is arranged to be located within the turning locus of the bent part 42a which obtains when the main movable mirror 1 is in repose in its original position. Therefore, in accordance with the arrangement of this embodiment, the auxiliary movable mirror 41 can be prevented from rebounding only when the mirror 41 comes back to the original position thereof. Further, in this embodiment, the auxiliary movable mirror 41 is arranged to be turned by spring balance in the direction or in the opening clockwise direction against the force of the return spring 43. Therefore, the spring force of the return spring 5 for the main movable mirror 1 must be arranged larger than that of the other return spring 43.

In the embodiments given in the foregoing, the parts engaging the antibounce levers 16 and 33 or 46 for the main and auxiliary movable mirrors 1 and 27 or 41 are respectively the uplifting pin 6 and mirror down pin 30 or bent part 42a which are provided for the purpose of driving the mirrors. However, these engaging parts of course may be replaced with some other suitable parts forming the main and auxiliary movable mirrors 1 and 27 or 41. In other words, the above-stated purpose can be attained by arranging any parts that give the turning loci of the main and auxiliary mirrors 1 and 27 or 41 to engage the antibounce members 16 and 33 or 46. In these embodiments, the movable mirrors are arranged to be turnable. However, the advantageous effect of the invention is of course also attainable by applying it to the movable mirrors arranged to be moved in different manners such as by means of a link mechanism, etc.

In accordance with the invention, the rebound of a movable mirror can be effectively prevented on its return to its original position without causing any obstacle to a forced uplifting or bringing-down operation on the mirror. The basic arrangement according to the invention is as follows: Antibounce means which is arranged in the neighborhood of a movable mirror has its position biased in such a way as to present no hindrance to the movement of the movable mirror during a series of operating processes in which the movable mirror is either uplifted or brought down from its original set position within a photo-taking optical path. The antibounce means is freed from the biased state and allowed to shift to a predetermined posture or position immediately before the return of the mirror to its original set position at the latest in such a way as to suppress or moderate the rebound of the mirror. Then, before a next uplifting or bringing-down operation on the movable mirror, the antibounce means is again brought into the biased position in response, for example, to a film winding operation or the like.

Such being the arrangement, the antibounce means causes absolutely no obstacle to the uplifting or bringing-down operation on the movable mirror and is arranged to prevent the rebound of the mirror on its return to the original position. Besides, the force to be exerted for the purpose of biasing the position of the antibounce means and for freeing it from the biased state is obtainable without any direct relation to the structural arrangement sustaining a reaction force resulting from the suppressing force exerted on the rebound of the movable mirror. This, therefore, enables the antibounce action to be carried out to a full extent.

It is another advantageous feature of this invention that the moving torque of the movable mirror can be adjusted by applying a buffering action thereon at any point of time during the movement of the mirror, so that reduction in speed or suppression of the rebound of the mirror can be accomplished as desired.

While specific embodiments of the invention have been shown and described in detail to illustrate the application of the inventive principles, it will be understood that the invention may be embodied otherwise without departing from such principles.

What I claim is:

1. A movable mirror shifting mechanism for a camera, comprising:
   (1) a movable mirror member;
   (2) shifting means for forcedly shifting the movable mirror member to a predetermined position;
   (3) returning means for returning said movable mirror member from the shifted position to which said mirror member is shifted by said shifting means to the original position thereof;
   (4) stopper means for bringing the movable mirror member to a stop in the original position when the mirror member is returned thereto by said returning means; and
   (5) antibounce means for preventing rebound of said movable mirror member due to collision thereof with said stopper means, said antibounce means being arranged in a position biased outside of a moving locus of said movable mirror member when in the early stages of shifting by said shifting means and being moved within an antibounceable area inside of the moving locus of said movable mirror member immediately before said movable mirror member has returned to the original position defined by said stopper means.

2. A movable mirror shifting mechanism according to claim 1, wherein said shifting means is arranged to forcedly shift said movable mirror member in response to a shutter release operation of the camera to a position where an exposure operation can be performed on a film.

3. A movable mirror shifting mechanism according to claim 1, wherein said movable mirror member is arranged to be rotatable on a shaft.

4. A movable mirror shifting mechanism according to claim 1, wherein said returning means includes at least a return spring.

5. A movable mirror shifting mechanism according to claim 1, wherein said stopper means is arranged to abut on said movable mirror member when said mirror member moves in a returning direction.

6. A movable mirror shifting mechanism according to claim 1, further comprising position biasing drive means for biasing the position of said antibounce means from a position within the moving locus of said movable mirror member to a position outside said moving locus.

7. A movable mirror shifting mechanism according to claim 6, wherein said position biasing drive means is arranged to operate in response to an operation of the camera.

8. A movable mirror shifting mechanism for a camera, comprising:
   (1) a movable mirror member;
   (2) shifting means for forcedly shifting the movable mirror member to a predetermined position;
   (3) returning means for returning said movable mirror member from the shifted position to which said mirror member is shifted by said shifting means to the original position thereof;
   (4) stopper means for bringing said movable mirror member to a stop in the original position when the mirror member is returned thereto by said returning means; and
   (5) antibounce means for preventing rebound of said movable mirror member due to collision with said stopper means, said antibounce means being arranged to have the position thereof biased to a position outside the moving locus of said movable mirror member at the initial stage of the process of shifting the mirror member by said shifting means and to come inside the moving locus of said movable mirror member by being released from the biased state before the return of said mirror member to the original position defined by said stopper means, said antibounce means, while coming into sliding contact with said movable mirror member at an intermediate point during the return of said movable mirror member to the original position, having once been moved toward biased position and then being positioned inside said moving locus immediately before said stopper means stops said movable mirror member in the original position, said antibounce means being thus arranged to come into sliding contact with said movable mirror member to prevent rebound of the mirror member on the return thereof to the original position.

9. A movable mirror shifting mechanism according to claim 8, wherein said camera includes a photographic lens and sensor means and wherein said movable mirror member is arranged at a predetermined angle relative to said photographic lens to guide light coming through said photographic lens to said sensor means.

10. A movable mirror shifting mechanism according to claim 8, wherein said shifting means is arranged to forcedly shift said movable mirror member in response to a shutter release operation of the camera to a position where an exposure operation can be performed on a film.

11. A movable mirror shifting mechanism according to claim 8, wherein said movable mirror member is arranged to be rotatable on a shaft.

12. A movable mirror shifting mechanism according to claim 8, wherein said returning means includes at least a return spring.

13. A movable mirror shifting mechanism according to claim 8, wherein said stopper means is arranged to abut on said movable mirror member when said mirror member moves in a returning direction.

14. A movable mirror shifting mechanism according to claim 8, further comprising position biasing drive means for biasing the position of said antibounce means from a position within the moving locus of said movable mirror member to a position outside said moving locus.

15. A movable mirror shifting mechanism according to claim 14, wherein said position biasing drive means is arranged to operate in response to an operation of the camera.

16. A movable mirror shifting mechanism for a camera, comprising:
  (1) a first movable mirror member;
  (2) a second movable mirror member arranged to carry said first movable mirror member;
  (3) first shifting means for forcedly shifting said first movable mirror member to a predetermined position;
  (4) second shifting means for forcedly shifting said second movable mirror member to a predetermined position;
  (5) first returning means for returning said first movable mirror member from the shifted position to which said mirror member is shifted by said first shifting means to the original position thereof;
  (6) second returning means for returning said second movable mirror member from the shifted position to which said mirror member is shifted by said second shifting means to the original position thereof;
  (7) first stopper means for bringing said first movable mirror member to a stop in the original position when the mirror member is returned thereto by said first returning means;
  (8) second stopper means for bringing said second movable mirror member to a stop in the original position when the mirror member is returned thereto by said second returning means;
  (9) a first antibounce member arranged to be shiftable between two different states, in one state, said first antibounce member being positioned within the moving locus of said first mirror member and, in the other, said first antibounce member being positioned outside said moving locus;
  (10) a second antibounce member arranged to be shiftable between two different states, in one state, said second antibounce member being positioned within the moving locus of said second mirror member and, in the other, said second antibounce member being positioned outside said moving locus;
  (11) first control means arranged at least to bias the position of said first antibounce member to the state of being positioned outside the moving locus of said first movable mirror member at the beginning of movement of said first movable mirror member by said first shifting means and to release said first antibounce member from said biased state to shift it to the state of being positioned within the moving locus of said first movable mirror member when said first movable mirror member comes to a predetermined point of movement by said first returning means; and
  (12) second control means arranged at least to bias the position of said second antibounce member to the state of being positioned outside the moving locus of said second movable mirror member at the beginning of movement of said second movable mirror member by said second shifting means and to release said second antibounce member from said biased state to shift it to the state of being positioned within the moving locus of said second movable mirror member when said second movable mirror member comes to a predetermined point of movement by said second returning means.

17. A movable mirror shifting mechanism according to claim 16, wherein said second camera includes a photographic lens and sensor means and wherein said movable mirror member is arranged at a predetermined angle relative to said photographic lens to guide light coming through said photographic lens to said sensor means.

18. A movable mirror shifting mechanism according to claim 16, wherein said first and second shifting means are arranged to forcedly shift said first and second movable mirror members in response to a shutter release operation of the camera to a position where an exposure operation can be performed on a film.

19. A movable mirror shifting mechanism according to claim 16, wherein said movable mirror member is arranged to be rotatable on a shafts.

20. A movable mirror shifting mechanism according to claim 5, wherein said camera further includes a viewfinder optical system and wherein said first movable mirror member is arranged at a predetermined angle between said photographic lens and an image plane to guide light coming through said photographic lens to said viewfinder optical system.

* * * * *